A. A. MITCHELL.
SEED CORN STRINGER AND HANGER.
APPLICATION FILED JUNE 4, 1918.
1,292,007.
Patented Jan. 21, 1919.
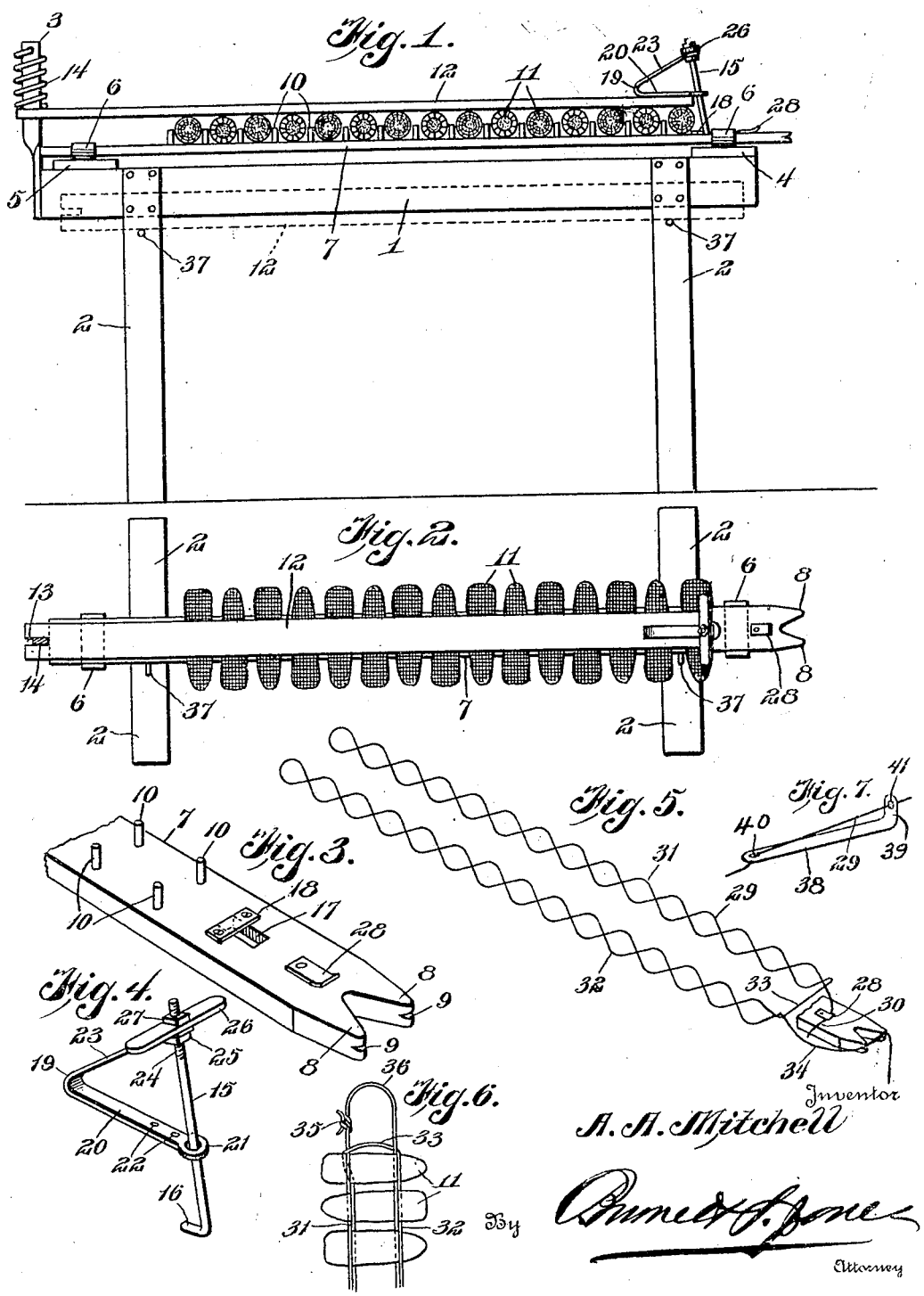

ial No, 238,107.

UNITED STATES PATENT OFFICE.

ARCHIE A. MITCHELL, OF COON RAPIDS, IOWA.

SEED-CORN STRINGER AND HANGER.

1,292,007.

Specification of Letters Patent.  Patented Jan. 21, 1919.

Application filed June 4, 1918. Serial No, 238,107.

*To all whom it may concern:*

Be it known that I, ARCHIE A. MITCHELL, a citizen of the United States, residing at Coon Rapids, in the county of Carroll and State of Iowa, have invented new and useful Improvements in Seed-Corn Stringers and Hangers, of which the following is a specification.

This invention relates to a seed corn stringer and hanger, one object of the invention being to provide a device for easily, quickly, conveniently and efficiently weaving a cord in looped formation about the ends of a number or series of ears of corn arranged in parallel relation, and in such manner that they may be suspended from a support and held in proper position for drying and preservation.

A further object of the invention is to provide a device of the character stated which is adapted for stringing ears of corn of any desired size, and to enable a cord of maximum strength to be applied to hold a desired number of ears connected and in such manner as to be firmly suspended from a support.

A still further object of the invention is to provide a means for holding the ears of corn in proper position while the cord is being woven or applied, said means including a base bar adapted also to be employed to elevate and hang the strung ears from a nail or other support in a ready and convenient manner.

With these and other objects in view, the invention consists in the features of construction, combination and arrangement of parts, hereinafter fully described and claimed, reference being had to the accompanying drawing, in which:

Figure 1 is a side elevation of a seed corn stringer and hanger constructed in accordance with my invention, and showing a series of ears of corn in position to be strung.

Fig. 2 is a top plan view of the same.

Fig. 3 is a fragmentary perspective view of the base bar or bottom clamping member of the device.

Fig. 4 is a perspective view of the spring latch for holding the upper clamping bar in clamping position.

Fig. 5 is a diagrammatic perspective view showing the cord as it appears after being woven onto the series of ears of corn and just prior to the formation of the suspending loop.

Fig. 6 is a detail view of one end of the completed string showing the cord as applied to the ears of corn and also showing the suspending loop completed and ready for hanging.

Fig. 7 is a detail view of the needle preferably employed.

In carrying my invention into practice, I provide a suitable supporting frame, which is similar to that of an ordinary carpenter's trestle, said frame comprising an upper horizontal bar 1 mounted upon supporting legs 2, and to the rear end of which bar is fastened a post or upright 3.

Secured to the upper surface of the bar 1 are front and rear bed blocks 4 and 5 upon which are mounted transversely, broad U-shaped seats or retaining members 6 to receive a removable clamping bar 7, which is adapted to rest in said seats when in operative position and to be lifted out of engagement therewith, for removal of the strung corn.

The bar 7 is adapted, when in operative position, to abut at its rear end against the post 3 and is of a length somewhat greater than the bar 1 to project at its forward end a short distance beyond the forward end of the bar 1. This forward end of the bottom clamping bar 7 is notched or bifurcated to provide a pair of V-shaped forwardly projecting prongs 8 formed in their points with transverse, V-shaped cord retaining notches 9. From the upper surface of the bar 7 project, at regular intervals apart, spacing pins or members 10, forming intervening spaces or compartments to receive the ears of corn 11 which are to be bound or strung together.

The ears of corn 11 are fitted in the compartments between the spacing members 10 so as to extend lengthwise transversely of the bar 7 and to have their ends project beyond opposite sides of said bar, such ends projecting sufficiently to permit of the application of the binder cord thereto. In practice, it is preferred to number the ear receiving spaces or compartments for ready reference and to dispose the ears so that the point and butt ends of the ears will be arranged alternately and properly disposed to equalize the weight upon the sides of the hanger, thus enabling the ears of corn to be bound together in a snug and compact manner.

For the purpose of holding the ears of corn in position upon the bar 7 while the cord is being applied, an upper clamping bar 12 is employed. This bar, in use, is arranged so as to rest upon the series of ears of corn resting on the bar 7, and at its rear end said bar 12 is formed with a notch 13 to receive and engage the post or upright 3. A coiled spring 14 surrounds the upper portion of the post 3 and is fixed at its upper end thereto, its lower end being free for movement to bear upon the bar 12, so that when said bar 12 is placed in position the spring 14 will be slightly compressed to hold the rear end of the bar 12 in place firmly upon the corn.

The forward end of the bar 12 is adapted to be secured in position by means of a clamping or fastening device comprising a rod 15 having a hooked lower end 16 for insertion into a mortise or recess 17 in the forward end of the bar 7 and to engage under a keeper or retainer plate 18 extending over the rear portion of said mortise or recess 17, the construction being such as to permit the hooked end of the rod 15 to be engaged with the keeper plate and withdrawn from engagement therewith by rearward and forward movements, respectively, in said mortise or recess. Carried by the rod 15 is a V-shaped clamping spring 19. The lower arm 20 of this spring has a terminal eye 21 to slidably engage the rod and is formed adjacent thereto with openings 22 for the passage of fastening devices to affix said arm to the bar 12. The upper arm 23 of the spring is provided with a terminal eye for engagement with the upper threaded end 24 of the rod 15, such end of said rod being provided with a lower nut 25 forming an abutment for said end of the spring and against which the same is clamped by a transverse head or cross plate 26 secured in position by a clamping or retaining nut 27. The cross plate 26 forms a handle by means of which the rod 15 may be manipulated, as hereinafter described. Disposed upon the forward end of the bar 7 between the keeper mortise 17 and the forks 8 is a spring clip 28 beneath which one end of the twine 29 is inserted in the operation of weaving said twine about the projecting ends of the clamped ears of corn.

In the operation of applying the twine 29 to the clamped ears of corn held between the bars 7 and 12, one end of the twine 29 is connected with the needle 38 by inserting it into end 39, passing it along the side of the needle and putting it through the eye in end 40 (Fig. 7) and then securing it to bar 7 by drawing it firmly under slip 28 as indicated at 30 (Fig. 5). Then taking needle in the hand next to end 39 and regulating the tension of the twine with the thumb or finger as it passes along the side of the needle, the twine is woven about the ears of corn whereby they project from the sides of bars 7 and 12 by means of end 40 of needle, putting it over the first ear down between the first and second ears under the second and so on throughout the series. As shown in Fig. 5, it will be seen that the twine is extended from the end 30 over one end of the first ear of the series and then drawn under the adjacent end of the next ear of the series, and so on throughout the series, and is then passed back over the ends of the ears in a similar manner, but in a reverse direction, to provide a cross weave of ear engaging loops forming the strand 31, the cord thence being extended transversely, as shown at 33, from the front end of the strand 31, and thence extended in the manner previously described with reference to the strand 31 to form the strand 32, which is similar in all respects to the strand 31. The opposite end 34 of the cord is then looped about the cross tie 33, which connects the forward or upper ends of the two strands 31 and 32 and is engaged with the notches 9 in the prongs 8, so that a portion of the end 34 of the cord will extend across the space between the prongs. The end 30 of the cord is then removed from the clip 28 and tied to the extremity of the end 34, as shown at 35, to form a suspending loop 36.

The series of ears of corn will thus be held and tied together by the strands 31 and 32, which are united by the cross tie 33 and the loop 36, and are in condition to be suspended from a nail in a rafter or other like support for preservation. In removing the strung series of ears, the rod 15 is depressed by means of the handle 36, the arm 23 of the spring 19 yielding in this action, to force the hook 16 below the retaining plate 18, thus releasing the clamp from engagement with the bar 7, whereupon the bar 12 may be withdrawn from engagement with the post 3. The bar 7 is then free for removal from the frame and is to be employed as a tool or implement for carrying the strung corn to the proper point and hanging it upon its support. To this end the bar 7 is simply removed, with the strung corn held in position thereon, and transported to the desired point, after which by elevating the bar the corn is lifted until the loop 36 is brought into position to engage the nail or supporting member on the rafter, the nail being allowed to enter in the space between the fork arms 8 so as to project within the loop 36, whereby upon simply sliding the bar 7 downwardly the bound string of corn will be left suspended. The device thus provides, in the form of the bar 7, an implement whereby, after the corn is strung, the string of corn may be readily transported and hung with convenience from the desired support.

It will, of course, be understood that the device may be constructed for holding and weaving any desired number of ears of corn into a string, and for stringing ears of corn of any desired size, in such a manner that when the corn shrinks from drying the ears will maintain their proper relative position without throwing excess strain upon either binder strand and without liability of the ears slipping out of the confining loops.

Supporting pins or loops 37 may be provided upon the frame work on which the bar 12 may be rested when not in use, as when the spaces or compartments of the bar 7 are being filled with the ears of corn which are to be strung.

Having thus fully described my invention, I claim:

1. A device for stringing ears of corn comprising a frame support, a bar provided with means for holding a series of ears in parallel relationship, a holding member carried by the frame against which one end of said bar is adapted to abut, a second bar for clamping the ears against the first named bar, said second bar being detachably connected at one end with said holding member, and a fastening means for detachably connecting said second bar at its opposite end with the first named bar.

2. A seed corn stringer including a supporting framework, a bottom clamping bar adapted to rest upon said framework, said bar being removably mounted upon the framework, an upright carried by the framework, a second clamping bar slidably engageable at one end with said upright, a pressure spring upon the upright for holding said end of said second named bar in clamping position, and a fastening device carried by the opposite end of the second named bar for detachably connecting the same with the first named bar.

3. A seed corn stringer comprising a framework, a bottom clamping bar removably mounted upon the framework, an upright upon the framework, a top clamping bar detachably connected at one end with said upright, a coiled spring carried by the upright to bear upon such end of the upper clamping bar, and a spring actuated latch device carried by the opposite end of the upper clamping bar for detachable engagement with the lower clamping bar.

4. A seed corn stringer comprising a framework, a lower clamping bar supported by the framework, said bar having a mortise therein and a keeper plate extending across a portion of said mortise, an upright projecting from the framework, an upper clamping bar detachably engaged at one end with said upright, means for holding said end of the upper clamping bar in engagement with the upright, and a spring actuated depressible latch rod carried by the opposite end of the upper clamping bar and having a hooked end to enter the mortise in the lower clamping bar and to engage under said keeper plate.

5. A seed corn stringer comprising a framework, a bottom clamping bar detachably mounted upon the framework for supporting the ears, said bottom clamping bar having at one end a cord retaining clip and fork arms provided with cord retaining notches, a top clamping bar, means for detachably connecting one end of said top clamping bar with the framework, and means for detachably connecting the opposite end of said top clamping bar with the lower clamping bar.

6. In a seed corn stringer, upper and lower bars adapted to confine corn ears between them, means holding the said bars connected at one end, and a latch detachable from both of said bars near the opposite ends thereof for securing the said ends together.

7. In a seed corn stringer, a supporting frame, a post on said frame, upper and lower bars engaged at one end with said post, the said lower bar having a catch at its opposite end, a latch bar adapted to engage at one end with said catch, a resilient member on said latch bar adapted to engage said upper bar and to force the same against said lower bar, and means on said latch bar for varying the tension of said member.

8. In a seed corn stringer, upper and lower bars adapted to confine corn ears between them, means for detachably holding said bars together at their ends, and a cord clamp on one of said bars.

9. In a seed corn stringer, upper and lower bars adapted to confine corn ears between them, means holding said bars at one end, the opposite end of said lower bar having an opening therein, a latch bar, an angular portion on said latch adapted to engage in said opening, a spring having spaced arms engaged on said latch bar, one of said arms adapted to rest upon said upper bar, means for varying the tension of said arms, and a hand grip on said latch bar.

10. In a seed corn stringer, upper and lower bars adapted to confine corn ears between them, means connecting said bars at one end, a latch connecting the said bars near their opposite ends, one of said bars being bifurcated at one end, and the ends of the bifurcations being notched to receive a cord.

11. In a seed corn stringer, a supporting frame, retaining members on said frame, a post at one end of said frame, the lower bar resting in said retaining members and engaged at one end with said post, an upper bar detachably connected at one end with said post, a spring on said post forcing the said upper bar toward the lower bar, and means near the opposite ends of said bars detachably holding the same together.

In testimony whereof I affix my signature.

ARCHIE A. MITCHELL.